United States Patent

Richards et al.

[11] Patent Number: 5,999,742
[45] Date of Patent: Dec. 7, 1999

[54] DUAL LATCH DATA TRANSFER PACING LOGIC USING A TIMER TO MAINTAIN A DATA TRANSFER INTERVAL

[75] Inventors: Grant B. Richards, Meridian, Id.; Delnis L. Miranda, Fremont, Calif.

[73] Assignee: Zilog, Inc., Campbell, Calif.

[21] Appl. No.: 08/378,660

[22] Filed: Jan. 26, 1995

[51] Int. Cl.⁶ .................................................. G06F 13/00
[52] U.S. Cl. ...................... 395/821; 395/821; 395/845; 395/878; 395/877; 395/881; 395/550
[58] Field of Search ................................... 395/821, 845, 395/878, 307, 305, 880, 881, 877, 550

[56] References Cited

U.S. PATENT DOCUMENTS

| | | | |
|---|---|---|---|
| 3,851,335 | 11/1974 | Elliott | 360/26 |
| 4,357,665 | 11/1982 | Korff | 364/492 |
| 4,425,664 | 1/1984 | Sherman et al. | 375/222 |
| 4,441,154 | 4/1984 | McDonough et al. | 395/800.43 |
| 4,525,804 | 7/1985 | Mosier et al. | 710/66 |
| 4,607,348 | 8/1986 | Sheth | 395/881 |
| 4,641,263 | 2/1987 | Perlman et al. | 395/500 |
| 4,651,316 | 3/1987 | Kocan et al. | 370/462 |
| 4,700,358 | 10/1987 | Duncanson et al. | 375/222 |
| 4,785,416 | 11/1988 | Stringer | 395/500 |
| 4,930,069 | 5/1990 | Batra et al. | 709/212 |
| 4,970,679 | 11/1990 | Tachibana | 341/122 |
| 5,062,059 | 10/1991 | Youngblood et al. | 709/217 |
| 5,075,874 | 12/1991 | Steeves et al. | 395/112 |
| 5,113,369 | 5/1992 | Kinoshita | 395/307 |
| 5,168,356 | 12/1992 | Acampora et al. | 348/409 |
| 5,181,201 | 1/1993 | Schauss et al. | 370/359 |
| 5,249,273 | 9/1993 | Yoshitake et al. | 395/386 |
| 5,297,246 | 3/1994 | Horiuchi et al. | 345/195 |
| 5,303,349 | 4/1994 | Warriner et al. | 710/62 |
| 5,424,996 | 6/1995 | Martin et al. | 365/233 |
| 5,619,681 | 4/1997 | Benhamida et al. | 395/500 |

OTHER PUBLICATIONS

Microcom DeskPorte Fast Reference Manual, Chpt. 3, p. 27.

*Primary Examiner*—Ayaz R. Sheikh
*Assistant Examiner*—Ario Etienne
*Attorney, Agent, or Firm*—Majestic, Parsons, Siebert & Hsue

[57] ABSTRACT

A dual latch character pacing circuit on a semiconductor chip controls data transfer between a pair of microprocessor which have significantly different data transfer rates. A first and second latch are connected in a parallel data path between the two microprocessor. The timing circuit includes a flip-flop which clocks the data between the latches. A one-shot timer is re-started on each transfer of data thereby insuring that the rate of transfer is substantially constant over a character period.

3 Claims, 3 Drawing Sheets

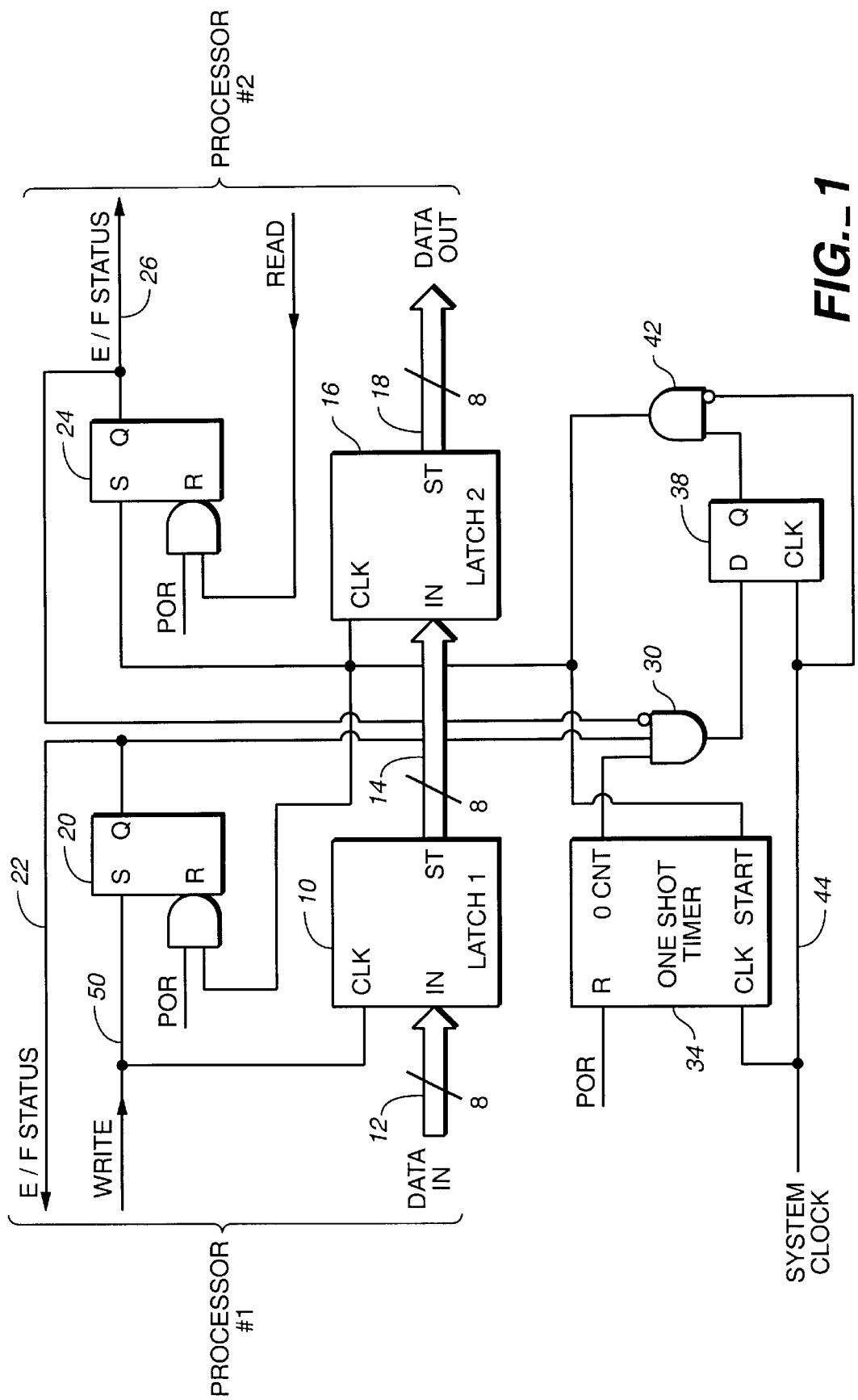
FIG._1

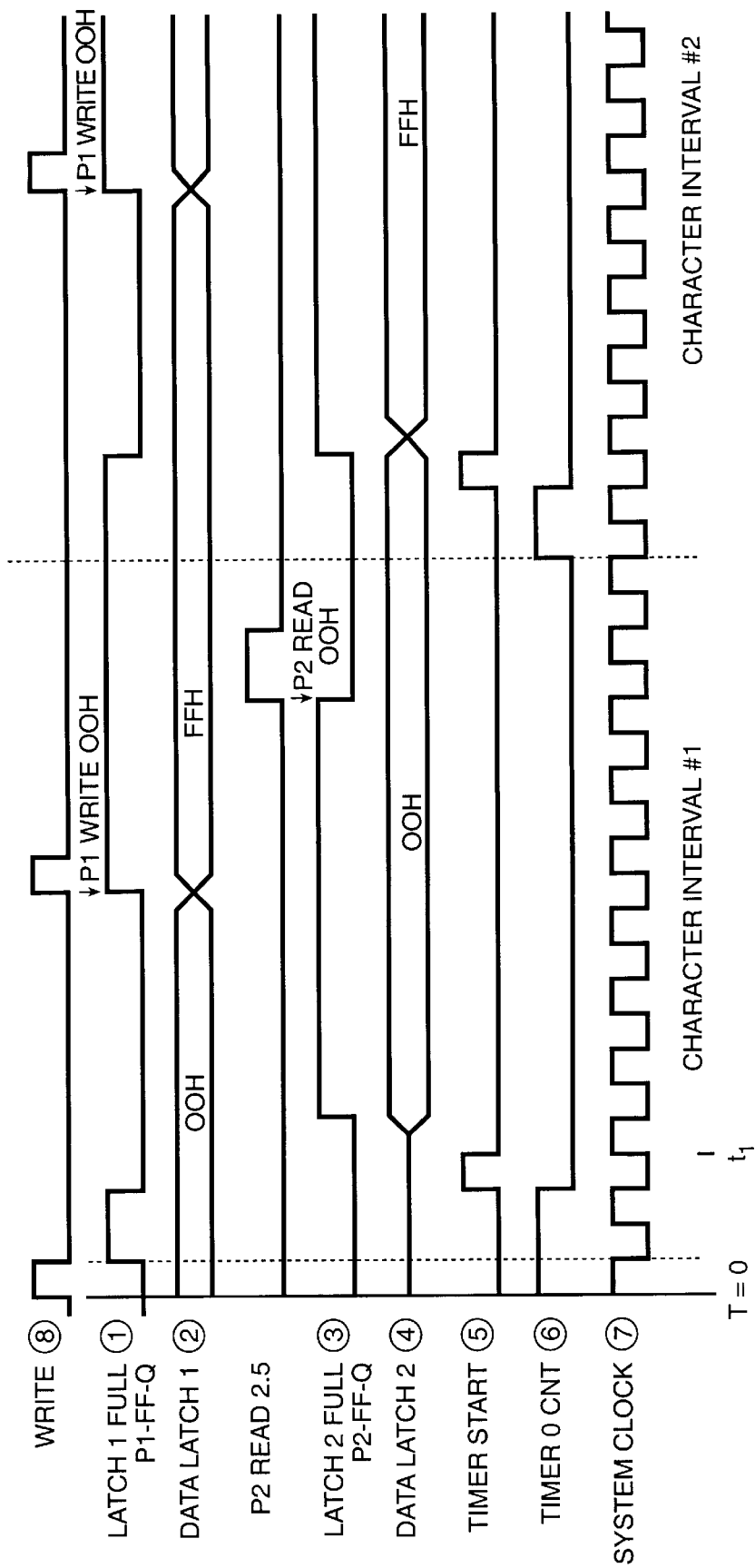

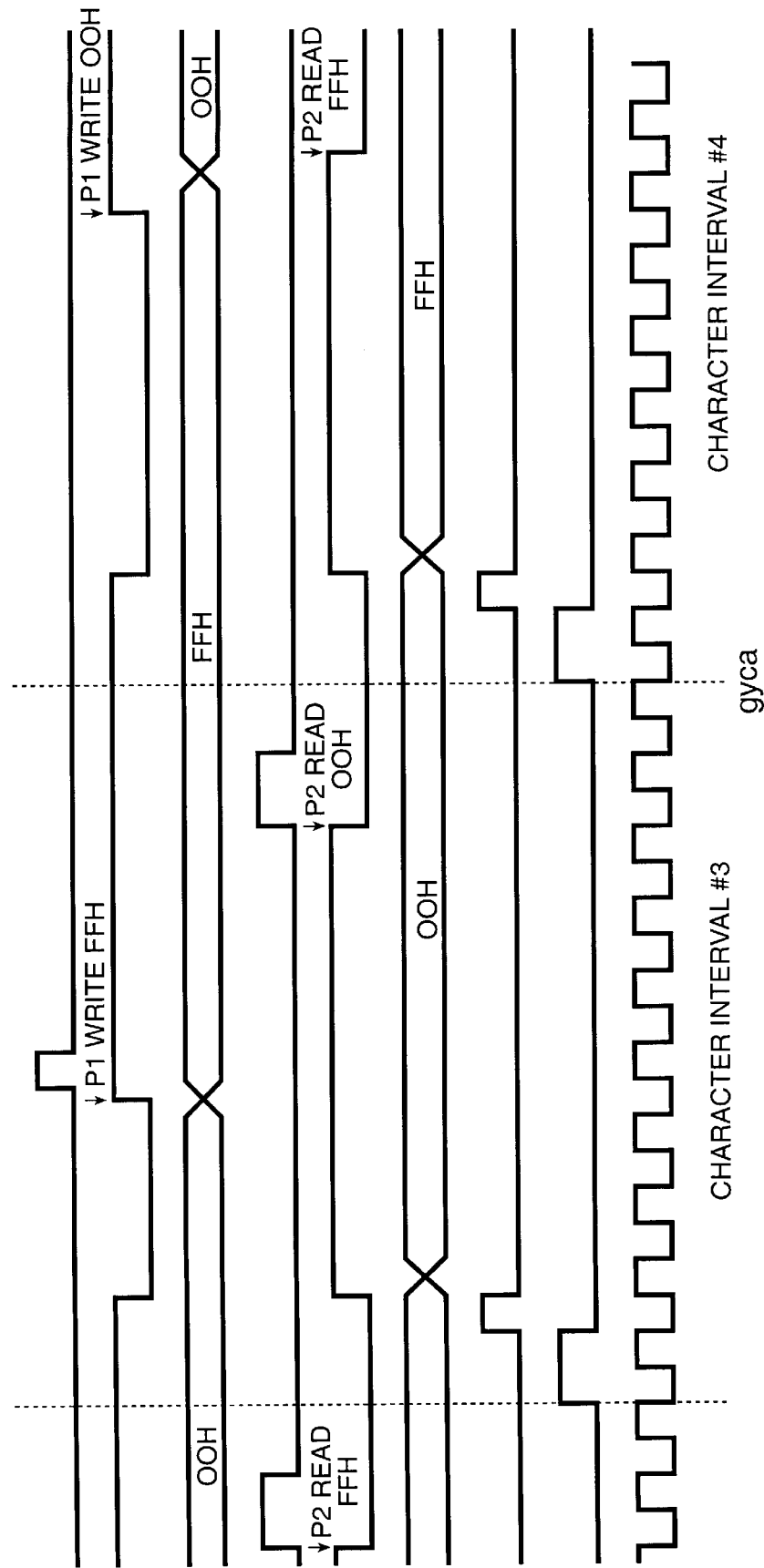
FIG._2B

DUAL LATCH DATA TRANSFER PACING LOGIC USING A TIMER TO MAINTAIN A DATA TRANSFER INTERVAL

FIELD OF THE INVENTION

This invention relates to a data path between a pair of microprocessors in general, and in particular, to a circuit on a semiconductor chip for controlling the data transfer between a microprocessor operating at one-data transfer rate and a second microprocessor which may be operating at a significantly different transfer rate.

DESCRIPTION OF THE PRIOR ART

Character pacing logic is known and may be used between two microprocessors to transfer data. If one microprocessor is able to supply data at one data rate and yet the second microprocessor is capable of receiving data at a much different rate, pacing logic is required to transfer data efficiently between the two microprocessors.

Under certain circumstances prior art pacing logic could cause critical timing errors resulting in a crash of the software. In addition, prior art pacing logic was often dependent upon the response time of the respective microprocessors. For example, the longer the first microprocessor would take to fill the pacing latch, the more the transfer rate between the microprocessor would be reduced. Similarly, the longer the second microprocessor takes to read the pacing latch, the more the transfer rate between the microprocessors is reduced.

SUMMARY OF THE INVENTION

An object of the present invention to provide pacing logic which allows the transfer of data between a pair of microprocessors having significantly different data transfer rates.

An advantage of the pacing logic according to the present invention is that it optimizes data transfer between a pair of microprocessors.

A particular feature of the present invention is that the data transfer rate between two microprocessors is independent of the response time and interrupt timing of each microprocessor provided that each microprocessor responds within one character inteval.

According to the present invention a dual latch character pacing circuit is provided on a semiconductor chip for controlling the data transfer between a pair of microprocessors. The first and second microprocessors typically have significantly different data transfer rates and may use interrupt signals as a part of the asynchronous data serial transfer. A first and second latch are connected in a parallel data path between the two microprocessors. The timing circuit includes a flip-flop connected to each latch for clocking the data between the latches. A one-shot timer is re-started on each data transfer thereby insuring that the rate of transfer is substantially constant over a character period.

BRIEF DESCRIPTION OF THE DRAWINGS

FIG. 1 is a block diagram of one embodiment of the pacing logic circuitry according to the present invention;

FIG. 2 is a timing diagram of the embodiment shown in FIG. 1.

DETAILED DESCRIPTION OF THE DRAWING

Referring initially to FIG. 1, there is seen one embodiment of the dual latch character pacing logic according to the present invention. The present invention is particularly well suited for use with an integrated circuit that has a dedicated high speed controller (not shown) that converts the serial input data to parallel input data and sends the parallel data to a microprocessor unit. This allows the transfer of data at very high rates which is beneficial for direct memory access and other uses.

A first latch 10 receives parallel data in via a bus 12 which is connected to a first microprocessor (not shown). A bus 14 connects the first latch 10 to a second latch 16. The second microprocessor (not shown) is connected via a bus 18 to receive data clocked out of the second latch 16. A flip-flop 20 provides an empty/full status signal on the line 22 to the first microprocessor. A flip-flop 24 provides an empty/full status signal on the line 26 to the second microprocessor.

The timing circuit further includes a AND gate 30 having one input connected to the Q terminal of the flip-flop 20, a second inverted input connected to the Q terminal of the flip-flop 24, and a third input connected to a one shot timer 34. The output of the AND gate 30 is connected to the D terminal of the latch 38. The Q terminal of the latch 38 is connected to one input of a AND gate 42 while the other input of the AND gate 42 is connected to receive a clock signal on the line 44 from a system clock (not shown).

The output from the AND gate 42 is connected to the start terminal of the one-shot timer 34 and the S terminal of the flip-flop 24.

Initially when the system is turned on at time to the power on reset signal resets the flipflops 20 and 24 as well as resetting the one-shot timer 34. The first microprocessor produces a write signal which is sent on a line 50 to set the flip-flop 20 and to clock the latch 10. At the same time the first microprocessor sends data bits in parallel on the data bus 12 to the first latch 10. At this time the status signal on the line 26 is low indicating that the latch 16 is empty. At the same time the empty full indicator on the line 22 has transistioned from low to high indicating that it is currently full. Also at this time the output of the AND 30 is high as is the D input to latch 38. On the next rising clock edge the Q terminal of the latch 38 goes high. On the next falling edge of the system clock the NAND 42 goes high which simultaneously clocks the data on the buss 14 into latch 16 and starting the one shot timer. Also the flip flop 20 is reset and the flip flop 24 is set. At this time the microprocess 1 may write new data into the latch 10. This is the initial sequence on start up when both latches are empty. At this time microprocessor 2 may read the data in from the latch 16 and simultaneously resets the flip flop 24. This complete the initial transfer cycle.

Now subsequent transfer cycles will be described.

Referring additionally to FIG. 2, there is seen a timing diagram for the dual latch character pacing logic of the present invention. At time t1 of the time diagram, after data is transfered from the latch 10 on the data bus 14 to the the latch 16, the status signal on the line 26 goes high indicating that the latch 16 is now full and the second microprocessor may read the starred data via the bus 18.

At the same time the one-shot timer 34 restarts, the status signal for the first latch 10 on the line 50 goes low. A write pulse on the line 50 switches flip flop 20 from low to high as the first microprocessor writes data into the latch 10. The next transfer cycle will occure on the time out of oneshot 34 provided that the second microprocessor has completed the read of latch 16.

The foregoing has described the principles, preferred embodiment and modes of operation of the present invention. However, the invention should not be construed as limited to the particular embodiment discussed. Instead, the above-described embodiment should be regarded as illustrative rather than rstrictive, and it should be appreciated that variations may be made in the embodiment by those of ordinary skill in the art without departing from the scope of the present invention as defined by the following claims.

What is claimed is:

1. A circuit on a semiconductor chip for controlling the data transfer between a first microprocessor and a second microprocessor, said first microprocessor and said second microprocessor having significantly different data transfer rates, comprising:

a first latch connected in a data path to said first microprocessor;

a second latch connected in said data path to said first latch and to said second microprocessor; and, control means for allowing said first microprocessor to read data to said first latch once during a character period when a status signal indicates that said first latch is empty so that data can be transferred from said first latch to said second latch, and for allowing said second microprocessor to read said second latch once during a character interval when a status signal indicates that said second latch is full, the control means further including a timer updated by a system clock, the timer maintains the character interval that is multiple clock periods long, wherein the timer sets the character interval such that the data transfer rate from the first microprocessor to the second microprocessor is done at a slower rate than the maximum data transfer rate of either of the two microprocessors, the control means allowing the first latch and second latch to load only once during the character interval.

2. The circuit of claim 1, wherein the timer sets the character interval to at least 8 clock periods long.

3. The circuit of claim 1, wherein the microprocessors transfer data in parallel and the timer sets the character interval so that the transfer is done at a slower rate consistent with a serial data transfer rate.

* * * * *